United States Patent
DeCato

(10) Patent No.: US 7,981,978 B2
(45) Date of Patent: Jul. 19, 2011

(54) LOW MODULUS, HUMIDITY RESISTANT SILICONE RTV COMPOSITIONS AND METHOD OF PREPARING SAME

(75) Inventor: Alfred A. DeCato, Oakville, CT (US)

(73) Assignee: Henkel Corporation, Rocky Hill, CT (US)

( * ) Notice: Subject to any disclaimer, the term of this patent is extended or adjusted under 35 U.S.C. 154(b) by 375 days.

(21) Appl. No.: 12/374,761

(22) PCT Filed: Jun. 28, 2007

(86) PCT No.: PCT/US2007/015046
§ 371 (c)(1),
(2), (4) Date: Jan. 22, 2009

(87) PCT Pub. No.: WO2008/005293
PCT Pub. Date: Jan. 10, 2008

(65) Prior Publication Data
US 2010/0139843 A1   Jun. 10, 2010

Related U.S. Application Data

(60) Provisional application No. 60/819,435, filed on Jul. 7, 2006.

(51) Int. Cl.
*C08L 83/04* (2006.01)

(52) U.S. Cl. ............. 525/477; 528/17; 528/18; 528/32; 528/34; 528/38; 428/447

(58) Field of Classification Search ........................ None
See application file for complete search history.

(56) References Cited

U.S. PATENT DOCUMENTS

| | | | | |
|---|---|---|---|---|
| 3,714,089 A | * | 1/1973 | Hamilton et al. | 528/18 |
| 4,410,677 A | * | 10/1983 | Lampe | 528/17 |
| 5,300,608 A | | 4/1994 | Chu et al. | |
| 5,498,642 A | | 3/1996 | Chu et al. | |
| 5,516,812 A | | 5/1996 | Chu et al. | |
| 5,567,764 A | | 10/1996 | Brasseur et al. | |
| 5,663,269 A | | 9/1997 | Chu et al. | |
| 6,828,355 B1 | | 12/2004 | Chu et al. | |
| 6,864,340 B2 | | 3/2005 | Levandoski et al. | |

FOREIGN PATENT DOCUMENTS

| | | |
|---|---|---|
| JP | 07-188561 | 7/1995 |
| WO | WO 97/35924 A1 | 10/1997 |

* cited by examiner

*Primary Examiner* — Marc S Zimmer
(74) *Attorney, Agent, or Firm* — Steven C. Bauman

(57) ABSTRACT

The present invention provides one-component silicone compositions, particularly useful as sealants, having low modulus and high elongation, as well as good resistance to high temperatures and humidity, and methods for preparing these sealants. In particular, the present invention provides compositions including a chain-extended curable polyorganosiloxane, a high molecular weight silicone gum and a cure system. The compositions may be used, for example, in sealing the stitching of automotive airbags.

24 Claims, No Drawings

LOW MODULUS, HUMIDITY RESISTANT SILICONE RTV COMPOSITIONS AND METHOD OF PREPARING SAME

FIELD OF THE INVENTION

The present invention provides silicone sealants having low modulus and high elongation, as well as good resistance to high temperatures and humidity. In particular, the present invention provides compositions including a chain-extended curable polyorganosiloxane, a high molecular weight silicone gum and a cure system, and methods of preparing these compositions.

BRIEF DESCRIPTION OF RELATED TECHNOLOGY

Curable silicone compositions are used in a broad range of applications including construction, highway, electronic device and package assembly, appliance assembly and consumer uses. Silicone compositions are used as sealants, conformal coatings, potting compounds, and the like. Typically, silicone compositions used in these applications have been tailored to provide the strength and toughness required for the application at hand. In addition to these properties, rapid cure speeds and product stability are often desired.

In some applications, it is desirable to use a sealant that has low modulus and high elongation, as well as good resistance to high temperatures and humidity. Previous one component silicone sealants have not provided such properties. For instance, when sealing automotive airbag stitching, it is desirable to use compositions that have low modulus and high elongation to allow for resistance to high deployment pressure and thereby maintain the integrity of the airbag stitching. Accordingly, the airbag can remain inflated longer after deployment. Additionally, it is desirable to use compositions that are resistant to high temperatures and humidity such that the airbag can perform to specification after long-term storage in the roofline of automobiles. Further, it also is desirable for the sealant to cure rapidly, thereby allowing the airbag to be stitched shortly after the sealant is applied.

Therefore, it is desirable to prepare rapidly curing compositions, useful as sealants, that exhibit low modulus and high elongation, as well as resistance to high temperatures and humidity. It additionally is desirable to provide such compositions as a one-component system. Two-component sealants suffer disadvantages, such as off-ratio performance during use, curing in the nozzle of the dispenser and higher equipment costs. The present invention accordingly provides new curable compositions, which may be used as one-component sealants, and are useful in automotive and other applications.

SUMMARY OF THE INVENTION

The present invention provides a class of curable silicone compositions, which may be useful as sealants. The cured compositions exhibit low modulus and high elongation, as well as resistance to high temperatures and humidity.

In one aspect of the present invention, there is provided a composition including:

a) a chain-extended curable polyorganosiloxane having the structure of formula III:

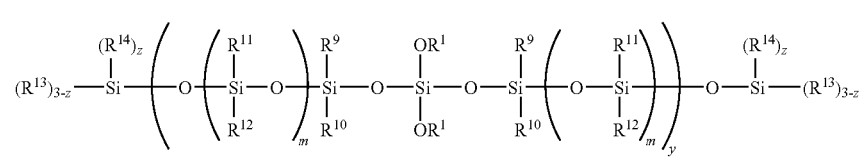

where $R^1$ is selected from tert-butyl, alkyl, allyl, phenyl, alkenyl and aryl; $R^9$, $R^{10}$, $R^{11}$ and $R^{12}$ are independently selected from $C_{1-4}$ alkyl; $R^{13}$ is selected from alkoxy, acetoxy, enoxy, oximino and amino; $R^{14}$ is selected from alkenyl and alkynyl; in is 10-2000; y is 1-50; z is 0-2;

b) a high molecular weight silicone gum; and c) a cure system.

In another aspect of the present invention, there is provided a composition including the reaction product of: a) at least one hydroxy-functionalized polydiorganosiloxane; b) di(tert-butoxy) diacetoxysilane; c) vinyltrioximinosilane; d) a first adhesion promoter including tris(3-(trimethoxysilyl) propyl) isocyanurate; e) a second adhesion promoter including gamma-ureidopropyltrimethoxy silane, where the first adhesion promoter is present in a ratio with the second adhesion promoter of about 3:1; and f) a catalyst.

In accordance with another aspect of the present invention, there is provided a method of preparing a curable composition, including the steps of:

a) reacting at least one hydroxy-functionalized polydimethylsiloxane with a silane having the structure:

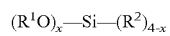

where $R^1$ is selected from tert-butyl, alkyl, allyl, phenyl, alkenyl and aryl, $R^2$ is selected from alkoxy, alkenoxy, acetoxy, enoxy, oximo and alkyl and x is 1-2, in the presence of a catalyst;

b) forming in situ a polyorganosiloxane having the structure of formula II:

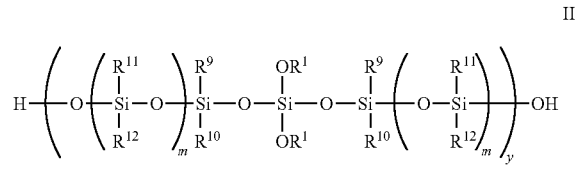

where $R^9$, $R^{10}$, $R^{11}$ and $R^{12}$ are independently selected from $C_{1-4}$ alkyl, m is 10-2000 and y is 1-50;

c) reacting formula II with a reactive silane selected from alkoxy silanes; acetoxy silanes; enoxy silanes; oximino silanes; amino silanes; and combinations thereof;

d) forming in situ a chain-extended curable polyorganosiloxane having the structure of formula III:

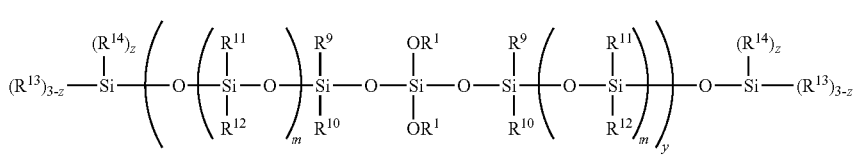

where $R^{13}$ is selected from alkoxy, acetoxy, enoxy, oximino and amino, $R^{14}$ is selected from alkenyl and alkynyl and z is 0-2; and e) adding a high molecular weight silicone gum and a cure system to form a curable composition.

In yet another aspect of the present invention, there is provided a method of sealing the stitching of an automobile airbag, including the steps of:

a) providing a composition including: i) a chain-extended curable polyorganosiloxane having the structure of formula III, as defined above; ii) a high molecular weight silicone gum; and iii) a cure system;

b) applying the composition to an inflatable substrate of an automobile airbag;

c) exposing the substrate to moisture at ambient conditions; and d) stitching the substrate to form a sealed automobile airbag.

In still another aspect of the present invention, there is provided a composition including the reaction product of:

a) a curable composition including: i) a chain-extended curable polyorganosiloxane having the structure of formula III, as defined above; and ii) a high molecular weight silicone gum;

b) water; and c) a moisture curing catalyst.

DETAILED DESCRIPTION OF THE INVENTION

The present invention provides one-component silicone compositions, which cure rapidly to produce reaction products having low modulus and good resistance to high temperatures and humidity. The compositions include a curable chain-extended polyorganosiloxane, which includes moisture curing groups, as well as a high molecular weight silicone gum and a cure system.

These inventive compositions are useful in a variety of end-use applications, such as sealants for automotive air bag stitching, as well as other uses in the electronic, automotive and consumer markets.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

The compositions according to the present invention include a chain-extended curable polyorganosiloxane having the following general formula III:

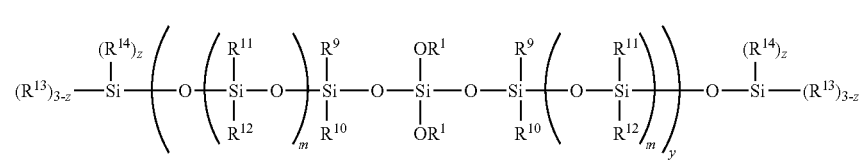

In formula III, desirably, $R^1$ is selected from tert-butyl, alkyl, allyl, phenyl, alkenyl and aryl, $R^9$, $R^{10}$, $R^{11}$ and $R^{12}$ are independently selected from $C_{1-4}$ alkyl, $R^{13}$ is selected from alkoxy, acetoxy, enoxy, oximino and amino, $R^{14}$ is an unsaturated hydrocarbon, such as alkenyl or alkynyl, m is 10-2000, y is 1-50 and z is 0-2.

More specifically, in some embodiments, the chain-extended curable polyorganosiloxane may have the general formula III(a):

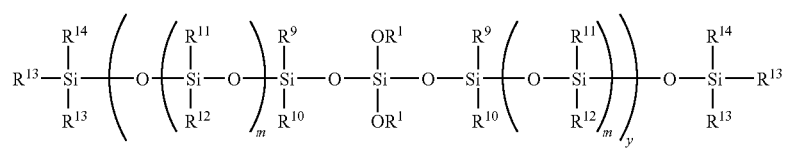

In formula III(a), desirably, the variables are as defined above for formula III.

The curable polyorganosiloxanes of formula III and formula III(a) may be formed as the reaction product of a reactive silane and a chain-extended polyorganosiloxane having the following general formula II:

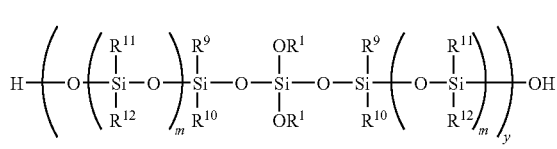

In formula II, desirably, the variables are as defined above for formula III.

The reactive silane acts to endcap the polyorganosiloxane of formula II. The reactive silane may be any silane having moisture curing groups. Suitable silanes include, but are not limited to, alkoxy silanes, acetoxy silanes, enoxy silanes, oximino silanes, amino silanes and combinations thereof. The silane also may include unsaturated hydrocarbon groups, such as, for example, alkenyl or alkynyl groups. A particularly suitable reactive silane includes, for example, vinyltrioximinosilane.

The polyorganosiloxanes of formula II may be formed as the reaction product of at least one hydroxy-functionalized polydiorganosiloxane and a silane having the following general formula I:

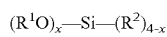
$$(R^1O)_x\text{—Si—}(R^2)_{4-x} \qquad \text{I}$$

In formula I, desirably, $R^2$ is selected from alkoxy, alkenoxy, acetoxy, enoxy, oximo and alkyl, x is 1-2 and $R^1$ is as defined above for formula III.

The silane of formula I acts as a chain-extender. Accordingly, the silane of formula I generally is present in the composition in amounts sufficient to chain extend the hydroxy-functionalized polydiorganosiloxane(s). For example, the ratio of the silane of formula I to the hydroxy-functionalized polydiorganosiloxane(s) may be about 1:10 to about 0.9:1, more specifically about 1:5.

The silane of formula I may be present in amounts of about 0.2% to about 2% by weight of the composition, more specifically about 0.5% to about 1.5% by weight of the composition.

The hydroxy-functionalized polydiorganosiloxane(s) may be present in amounts of about 20% to about 70% by weight of the composition, more specifically about 55% by weight of the composition.

Examples of suitable silanes of formula I include, but are not limited to, di-(tert-butoxy) diacetoxysilane; dimethyldimethoxysilane; and combinations thereof.

Hydroxy-functionalized polydiorganosiloxanes suitable for use in the present invention include those having the following general formula IV:

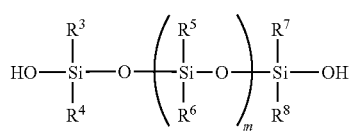

IV

In formula IV above, desirably, $R^3$, $R^4$, $R^5$, $R^6$, $R^7$ and $R^8$ may be independently selected from $C_{1-4}$ alkyl.

An example of a commercially available hydroxy-functionalized polydiorganosiloxane suitable for reaction with a compound of formula I is polydimethylsiloxane ("PDMS"), as represented by formula V:

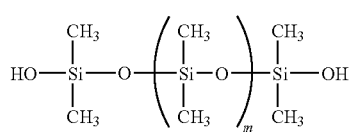

V

The number of repeating units, "m" plays a role in determining the molecular weight and hence the viscosity of the composition of the invention, particularly because the alpha organofunctional terminated end product of the reaction oftentimes has substantially the same viscosity as the silanol-terminated reactant. Thus, in may be, for example, an integer from about 10 to about 2000. The viscosity may be readily chosen for a particular product application. Viscosities of such hydroxy-functionalized polydiorganosiloxanes are often within the range of from about 10 cps to about 300,000 cps. Desirably, the viscosity range for those siloxanes used in the present invention may be from about 1000 cps to about 300,000 cps.

In accordance with the present invention, the reaction that produces the chain-extended polyorganosiloxanes of formula II, as well as the reaction that produces the curable polyorganosiloxanes of formula III or formula III(a), proceeds in situ in the compositions of the present invention. Once the hydroxy-functionalized polydiorganosiloxane(s) and the silanes described above are combined, in the presence of a catalyst, the reactions will proceed, thereby chain-extending the hydroxy-functionalized polydiorganosiloxane(s) and forming a curable chain-extended polyorganosiloxane of formula III or formula III(a).

More specifically, the silanes of formula I react with hydroxy-functionalized polydiorganosiloxanes in the presence of a catalyst to form in situ formula II. The silanes of formula I act to chain-extend the hydroxy-functionalized polydiorganosiloxanes. The reactive silanes having moisture curing groups act to endcap the chain-extended polyorganosiloxanes of formula II thereby forming in situ formula III or formula III(a).

Organo-lithium compounds are particularly suitable catalysts for this reaction. Examples of suitable organo-lithium compounds include, but are not limited to: methyl lithium; n-butyl lithium; sec-butyl lithium; t-butyl lithium; n-hexyl lithium; 2-ethylhexyl lithium; n-octyl lithium; phenyl lithium; vinyl lithium; lithium phenylacetylide; lithium (trimethylsilyl)acetylide; lithium dimethylamide; lithium diethylamide; lithium diisopropylamide; lithium dicyclohexylamide; lithium silanolate; lithium siloxanolate; and combinations thereof. Other catalysts known to those skilled in the art may be useful in forming the reactive polyorganosiloxanes of the present invention, but organo-lithium compounds are preferred because of the advantages associated therewith, as described in U.S. Pat. Nos. 5,300,608, 5,498, 642, 5,516,812 and 5,663,269 (assigned to Henkel Corporation), which are incorporated herein by reference in their entirety.

The compositions according to the present invention also include a high molecular weight silicone gum and a cure system. The high molecular weight silicone gum may have a molecular weight of about 200,000 to about 500,000. For instance, the gum may be a high molecular weight polydimethylsiloxane gum, which may have a molecular weight of about 200,000 to about 500,000.

The cure system used in the compositions of the present invention includes, but is not limited to, catalysts or other reagents which act to accelerate or otherwise promote the curing of the composition of the invention. Due to the presence of moisture curing groups, compounds of formula III and formula III(a) have the capability of curing by moisture curing mechanisms. Accordingly, the cure system in the compositions of the present invention may include a moisture curing, or condensation, catalyst. Any suitable moisture curing catalyst may be used, such as, organic titanium compounds, organic tin compounds, organic amines, combinations thereof, or any other known catalyst for moisture-curing silicones.

More specifically, suitable moisture curing catalysts include, but are not limited to, tin IV salts of carboxylic acids, such as dibutyltin dilaurate, organotitanium compounds such as tetrabutyl titanate, and partially chelated derivatives of these salts with chelating agents such as acetoacetic acid esters and β-di-ketones. Desirably, titanium alkoxide, dibutyl tin laurate or alkyl tin carboxylate are used. Additionally, organic amines such as tetramethylguandinemaines, diazabicyclo[5.4.0]undec-7-ene (DBU) and triethylamine and the like may be used.

Moisture curing catalysts may be present in amounts of about 10% or less by weight of the composition, more desirably about 0.01% to about 1.0% by weight of the composition and most desirably about 0.05% to about 0.5% by weight of the composition.

Fillers optionally may be included in the compositions of the present invention. Generally, any suitable mineral, carbonaceous, glass, or ceramic filler may be used, including, but not limited to: fumed silica; clay; metal salts of carbonates; sulfates; phosphates; carbon black; metal oxides; titanium dioxide; ferric oxide; aluminum oxide; zinc oxide; quartz; zirconium silicate; gypsum; silicium nitride; boron nitride; zeolite; glass; plastic powder; and combinations thereof. The filler may be present in the composition in any suitable concentration in the curable composition. Generally, concentrations of from about 5% to about 80% by weight of the composition are sufficient. However, a more desirable range would be 20-60%.

Among the more desirable fillers are reinforcing silicas. The silica may be a fumed silica, which may be untreated (hydrophilic) or treated with an adjuvant so as to render it hydrophobic. The fumed silica should be present at a level of at least about 5% by weight of the composition in order to obtain any substantial reinforcing effect. Although optimal silica levels vary depending on the characteristics of the particular silica, it has generally been observed that the thixotropic effects of the silica produce compositions of impractically high viscosity before maximum reinforcing effect is reached. Hydrophobic silicas tend to display lower thixotropic ratios and therefore greater amounts can be included in a composition of desired consistency. In choosing the silica level, therefore, desired reinforcement and practical viscosities must be balanced. A hexamethyldisilazane treated silica is particularly desirable (HDK2000 by Wacker-Chemie, Burghausen, Germany).

Adhesion promoters also may be included in the curable compositions. An adhesion promoter may act to enhance the adhesive character of the curable composition for a specific substrate (i.e., metal, glass, plastics, ceramic, and blends thereof). Any suitable adhesion promoter may be employed for such purpose, depending on the specific substrate elements employed in a given application. Various organosilane compounds may be desired.

Suitable organosilane adhesion promoters include, for example, 3-aminopropyltriethoxysilane, 3-aminopropyltrimethoxysilane, 3-aminopropylmethyldiethoxysilane, 3-aminopropylmethyldimethoxysilane, methylaminopropyltrimethoxysilane, 1,3,5-tris(trimethylsilylpropyl)isocyanurate, 3-glycidoxypropyltrimethoxysilane, 3-glycidoxypropylethyldimethoxysilane, 2-glycidoxyethyltrimethoxysilane, 2-cyanoethyltrimethoxysilane, 3-cyanopropyltriethoxysilane, isocyanatopropyltriethoxysilane, isocyanatopropyltrimethoxysilane, gamma-ureidopropyltrimethoxysilane, tris (3-(trimethoxysilyl) propyl) isocyanurate (commercially available under the trade name SILQUEST A-LINK 597 from General Electric Company), and combinations thereof.

Adhesion promoters, when present, may be used in amounts of about 0.1% to about 10% by weight of the composition. Desirably, the adhesion promoter is present from about 0.2% to about 2.0% by weight of the composition.

Some embodiments may include tris(3-(trimethoxysilyl) propyl) isocyanurate and gamma-ureidopropyltrimethoxysilane as adhesion promoters in a ratio of about 3:1.

The compositions also may include any number of optional additives, such as pigments or dyes, plasticizers, alcohol scavengers, stabilizers, anti-oxidants, flame retardants, UV-stabilizers, biocides, fungicides, thermal stabilizing agents, rheological additives, tackifiers, and the like or combinations thereof.

The present invention also is directed to compositions that include the reaction product of a curable composition, which includes a curable polyorganosiloxane of formula III or formula III(a) and a high molecular weight silicone gum, as described above, water and a moisture curing catalyst. The reaction product, for example, may provide a seal for the stitching on an automotive airbag.

The present invention also provides methods of preparing curable compositions of the present invention. In accordance therewith, a silane of formula I, described above, is reacted with at least one hydroxy-functionalized polydiorganosiloxane, also as described above. The silane of formula I chain-extends the hydroxy-functionalized polydiorganosiloxane(s) to form in situ a reaction product, i.e., the polyorganosiloxane of formula II.

The components desirably are reacted in the presence of a catalyst. The catalyst may be an organo-lithium compound, as described above.

The polyorganosiloxane of formula II is reacted with a reactive silane, also described above. The reactive silane includes moisture curing groups. The reactive silane endcaps the chain-extended polyorganosiloxane of formula II to form in situ a reaction product, i.e., the curable polyorganosiloxane of formula III or formula III(a).

The reaction may be performed at reaction temperatures of from about 0° C. to about 100° C., and preferably at about 50-75° C. The reaction may be performed for a time period suitable to permit the siloxanes to be chain-extended and capped. This time period depends, among other things, on the temperature of the reaction mixture, but will generally be within about 1 hour.

A high molecular weight silicone gum and a cure system may be added to form the curable composition.

Another method of the present invention is directed to sealing the stitching of an automobile airbag. In accordance with such method, a curable composition of the present invention, as described above, may be provided. The composition may be applied to an inflatable substrate of an automobile airbag. The substrate subsequently may be exposed to moisture at ambient conditions and then stitched to form a sealed automobile airbag.

EXAMPLES

Example 1

Curable compositions were prepared in accordance with the present invention. The components listed in Table 1 below were combined in the indicated amounts to provide the curable composition.

TABLE 1

| Component | Weight % |
| --- | --- |
| Hydroxy-terminated PDMS | 31.0 |
| Hydroxy-terminated PDMS | 26.0 |
| Di (t-butoxy) diacetoxysilane | 1.0 |
| Butyl lithium catalyst | 0.1 |
| Dry ice | 25 ml |
| Vinyl tris(methyl ethyl ketoxamino) silane | 3.0 |
| Red iron oxide | 1.0 |
| Calcium carbonate filler | 4.0 |
| Teflon powder | 4.0 |
| Fumed amorphous silica | 5.0 |
| Trimethyl-terminated PDMS | 19.9 |
| Silylated silica | 3.5 |
| Tris(3-(trimethoxysilyl) propyl) isocyanurate[1] | 0.94 |
| Gamma-ureidopropyltrimethoxy silane | 0.31 |
| Tin carboxylate catalyst | 0.25 |

[1]SILQUEST A-LINK 597 (commercially available from General Electric Company)

The two hydroxy-terminated polydimethylsiloxanes were combined and mixed for 5 minutes under dynamic vacuum. Di(t-butoxy) diacetoxysilane was added and mixed for 5 minutes under dynamic vacuum. Butyl lithium catalyst was added and mixed for 30 minutes under dynamic vacuum. 25 ml of crushed dry ice were then added to the mixture. Mixing continued for 10 minutes under dynamic vacuum. Vinyl tris (methyl ethyl ketoxamino) silane was added and mixed for 10 minutes under dynamic vacuum. Red iron oxide, calcium carbonate filler, Teflon powder and fumed amorphous silica were added and mixed under dynamic vacuum until melted into the mixture. Then the mixture was mixed at high shear under dynamic vacuum for 20 minutes. Trimethyl-terminated polydimethylsiloxane and silylated silica were added and mixed under dynamic vacuum until wetted in. The mixture then was mixed at high shear under dynamic vacuum for 20 minutes. The mixture then may be cooled, if necessary. The silane adhesion promoters (tris(3-(trimethoxysilyl) propyl) isocyanurate and gamma-ureidopropyltrimethoxy silane) and tin carboxylate catalyst then were added and mixed for 15 minutes under dynamic vacuum while cooling.

The composition was subjected to ambient moisture-curing conditions and the following properties were measured: skin-over time; extrusion rate; hardness; tensile strength; elongation; tear strength (measured in accordance with ASTM D624 using Die C); and peel strength (measured in accordance with ASTM 1876). Peel tests are generally used to measure the strength required to pull apart a bonded surface. In this Example, the peel strength was measured using the silicone coated side of a sample of automobile airbag fabric. The results are provided in Table 2 below.

TABLE 2

| Test | Result |
| --- | --- |
| Skin-over time (minutes) | 12 |
| Extrusion rate (90 psi) | 57 |
| Shore A hardness | 16 |
| Tensile strength (psi) | 223 |
| at 100% | 46 |
| Elongation (%) | 500 |
| Tear strength (ppi) | 26.3 |
| Peel strength (ppi): | |
| after 7 days room temperature cure | 20.1 |
| after 72 hours at 85° C. and 85% relative humidity | 18.7 |
| after 72 hours at 120° C. | 17.3 |

These results evidence that the composition has high elongation and good resistance to tearing. The peel strength results additionally indicate that the composition is resistant to humidity.

Example 2

Curable compositions were prepared in accordance with the present invention. The components listed in Table 3 below were combined in the indicated amounts to provide the curable composition.

TABLE 3

| Component | Weight % |
| --- | --- |
| Hydroxy-terminated PDMS | 28.00 |
| Hydroxy-terminated PDMS | 27.4 |
| Di (t-butoxy) diacetoxysilane | 1.0 |
| Butyl lithium catalyst | 0.1 |
| Dry ice | 10 ml |
| Vinyl tris(methyl ethyl ketoxamino) silane | 3.5 |
| Red iron oxide | 1.0 |

TABLE 3-continued

| Component | Weight % |
| --- | --- |
| Calcium carbonate filler | 4.0 |
| Teflon powder | 4.0 |
| Precipitated calcium carbonate | 4.0 |
| Fumed amorphous silica | 5.0 |
| Trimethyl-terminated PDMS | 10.0 |
| High molecular weight silicone gum | 7.0 |
| Silylated silica | 3.5 |
| Tris(3-(trimethoxysilyl) propyl) isocyanurate[1] | 0.94 |
| Gamma-ureidopropyltrimethoxy silane | 0.31 |
| Tin carboxylate catalyst | 0.25 |

[1]SILQUEST A-LINK 597 (commercially available from General Electric Company)

The components listed in Table 3 were combined in the same manner described in Example 1. The high molecular weight silicone gum was added with the trimethyl-terminated polydimethylsiloxane and silylated silica in this example.

The composition was subjected to ambient moisture-curing conditions and tested for the same properties described in Example 1. The results are provided in Table 4 below.

TABLE 4

| Test | Result |
| --- | --- |
| Skin-over time (minutes) | 10 |
| Extrusion rate (90 psi) | 30 |
| Shore A hardness | 19 |
| Tensile strength (psi) | 356 |
| at 100% | 72 |
| Elongation (%) | 518 |
| Tear strength (ppi) | 33.7 |
| Peel strength (ppi): | |
| after 7 days room temperature cure | 19.3 |
| after 72 hours at 85° C. and 85% relative humidity | 23.7 |
| after 72 hours at 120° C. | 23 |

These results evidence that the composition has high elongation and good resistance to tearing. The peel strength results additionally indicate that the composition is resistant to humidity.

Example 3

Curable compositions were prepared in accordance with the present invention. The components listed in Table 5 below were combined in the indicated amounts to provide the curable composition.

TABLE 5

| Component | Weight % |
| --- | --- |
| Hydroxy-terminated PDMS | 62.00 |
| Di (t-butoxy) diacetoxysilane | 1.00 |
| Dry ice | 10 ml |
| Vinyl tris(methyl ethyl ketoxamino) silane | 4.0 |
| Red iron oxide | 1.0 |
| Precipitated calcium carbonate | 4.0 |
| Fumed amorphous silica | 8.0 |
| Trimethyl-terminated PDMS | 10.0 |
| High molecular weight silicone gum | 7.0 |
| Fumed silica | 1.5 |
| Tris(3-(trimethoxysilyl) propyl) isocyanurate[1] | 0.94 |
| Gamma-ureidopropyltrimethoxy silane | 0.31 |
| Tin carboxylate catalyst | 0.25 |

[1]SILQUEST A-LINK 597 (commercially available from General Electric Company)

The hydroxy-terminated polydimethylsiloxane and di(t-butoxy) diacetoxysilane were mixed for 30 minutes under dynamic vacuum. 10 ml of crushed dry ice were added to the mixture. Mixing continued for 20 minutes under dynamic vacuum. Vinyl tris(methyl ethyl ketoxamino) silane was added and mixed for 15 minutes under dynamic vacuum. Red iron oxide, precipitated calcium carbonate and fumed amorphous silica were added and mixed with low shear until melted into the mixture. Then the mixture was mixed at high shear under dynamic vacuum for 20 minutes. Trimethyl-terminated polydimethylsiloxane, fumed silica and the high molecular weight silicone gum were added and mixed with low shear until melted in. The mixture then was mixed at high shear under dynamic vacuum for 20 minutes while cooling. The silane adhesion promoters (tris(3-(trimethoxysilyl) propyl) isocyanurate and gamma-ureidopropyltrimethoxy silane) and tin carboxylate catalyst then were added and mixed with medium shear for 15 minutes under dynamic vacuum while cooling.

The composition was subjected to ambient moisture-curing conditions and tested for the same properties described in Example 1. The results are provided in Table 6 below.

TABLE 6

| Test | Result |
| --- | --- |
| Skin-over time (minutes) | 12 |
| Extrusion rate (90 psi) | 84 |
| Shore A hardness | 20 |
| Tensile strength (psi) | 244 |
| at 100% | 60 |
| Elongation (%) | 415 |
| Peel strength (ppi): | |
| after 7 days room temperature cure | 17.5 |
| after 72 hours at 85° C. and 85% relative humidity | 16.6 |
| after 72 hours at 120° C. | 17.3 |

These results evidence that the composition has high elongation and good resistance to tearing. The peel strength results additionally indicate that the composition is resistant to humidity.

What is claimed is:

1. A composition comprising:
   a) a chain-extended curable polyorganosiloxane comprising the structure of formula III:

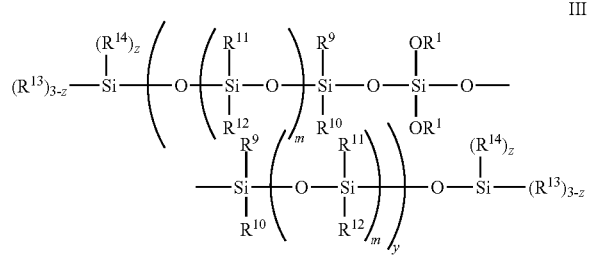

wherein:
   $R^1$ is selected from tert-butyl, alkyl, allyl, phenyl, alkenyl and aryl;
   $R^9$, $R^{10}$, $R^{11}$ and $R^{12}$ are independently selected from $C_{1\text{-}4}$ alkyl;
   $R^{13}$ is selected from alkoxy, acetoxy, enoxy, oximino and amino;
   $R^{14}$ is selected from alkenyl and alkynyl;
   m is 10-2000;
   y is 1-50;
   z is 0-2;
   b) a high molecular weight silicone gum; and
   c) a cure system.

2. The composition of claim 1, wherein said chain-extended curable polyorganosiloxane comprises the structure of formula III(a):

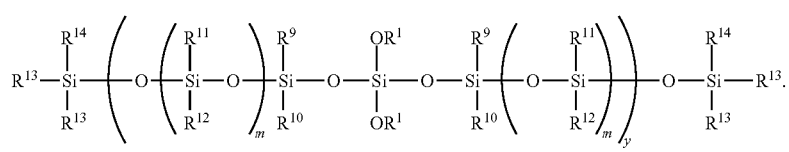

3. The composition of claim 1, wherein said chain-extended curable polyorganosiloxane is the reaction product of:
   a) a polyorganosiloxane comprising the structure of formula II:

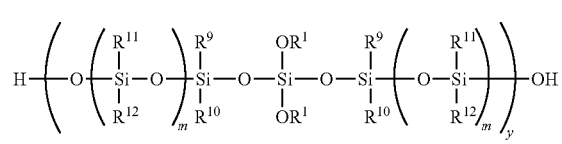

and
   b) a reactive silane.

4. The composition of claim 3, wherein said reactive silane is selected from the group consisting of: alkoxy silanes; acetoxy silanes; enoxy silanes; oximino silanes; amino silanes; and combinations thereof.

5. The composition of claim 3, wherein said reactive silane comprises vinyltrioximinosilane.

6. The composition of claim 3, wherein said compound of formula II is the reaction product of:
   a) at least one hydroxy-functionalized polydiorganosiloxane; and
   b) a silane comprising the structure of formula I:

$(R^1O)_x\text{—Si—}(R^2)_{4\text{-}x}$     I wherein $R^2$ is selected from alkoxy, alkenoxy, acetoxy, enoxy, oximo and x is 1-2.

7. The composition of claim 6, wherein said at least one hydroxy-functionalized polydiorganosiloxane comprises hydroxy-terminated polydimethylsiloxane.

8. The composition of claim 6 wherein said silane of formula I is di(tert-butoxy) diacetoxysilane.

9. The composition of claim 6, wherein said silane of formula I is present in amounts sufficient to chain extend said at least one hydroxy-functionalized polydiorganosiloxane.

10. The composition of claim 9, wherein said silane is present in a mole ratio with said at least one hydroxy-functionalized polydiorganosiloxane of about 1:10 to about 0.9:1.

11. The composition of claim 6, wherein said at least one hydroxy-functionalized polydiorganosiloxane is present in amounts of about 20% to about 70% by weight of said composition.

12. The composition of claim 6, wherein said silane is present in amounts of about 0.2% to about 2% by weight of said composition.

13. The composition of claim 1, wherein said high molecular weight silicone gum comprises a high molecular weight polydimethylsiloxane gum.

14. The composition of claim 1, wherein said high molecular weight silicone gum has a molecular weight of about 200,000 to about 500,000.

15. The composition of claim 1, wherein said cure system comprises a moisture curing catalyst selected from the group consisting of: organic titanium compounds; organic tin compounds; organic amines; and combinations thereof.

16. The composition of claim 1, further comprising an adhesion promoter.

17. The composition of claim 16, wherein said adhesion promoter comprises at least one organofunctional silane.

18. The composition of claim 16, wherein said adhesion promoter is selected from the group consisting of tris(3-(trimethoxysilyl) propyl) isocyanurate, gamma-ureidopropyltrimethoxy silane and combinations thereof.

19. The composition of claim 1, further comprising at least one filler.

20. The composition of claim 19, wherein said at least one filler is selected from the group consisting of: fumed silica; clay; metal salts of carbonates; sulfates; phosphates; carbon black; metal oxides; titanium dioxide; ferric oxide; aluminum oxide; zinc oxide; quartz; zirconium silicate; gypsum; silicium nitride; boron nitride; zeolite; glass; plastic powder; and combinations thereof.

21. A method of preparing a curable composition, comprising the steps of:
a) reacting at least one hydroxy-functionalized polydimethylsiloxane with a silane comprising the structure:

$$(R^1O)_x\text{—Si—}(R^2)_{4-x}$$

wherein $R^1$ is selected from tert-butyl, alkyl, allyl, phenyl, alkenyl and aryl, $R^2$ is selected from alkoxy, alkenoxy, acetoxy, enoxy, and oximo and x is 1-2, in the presence of a catalyst thereby forming in situ a polyorganosiloxane comprising the structure of formula II:

$$\text{II}$$

$$H\text{—}\left(\text{O—}\left(\underset{R^{12}}{\overset{R^{11}}{\text{Si}}}\text{—O}\right)_m\underset{R^{10}}{\overset{R^9}{\text{Si}}}\text{—O—}\underset{OR^1}{\overset{OR^1}{\text{Si}}}\text{—O—}\underset{R^{10}}{\overset{R^9}{\text{Si}}}\left(\text{O—}\underset{R^{12}}{\overset{R^{11}}{\text{Si}}}\right)_m\right)_y\text{OH}$$

wherein $R^9$, $R^{10}$, $R^{11}$ and $R^{12}$ are independently selected from $C_{1-4}$ alkyl, m is 10-2000 and y is 1-50;

b) reacting the polyorganosiloxane of formula II with a reactive silane selected from the group consisting of: alkoxy silanes; acetoxy silanes; enoxy silanes; oximino silanes; amino silanes; and combinations thereof thereby forming in situ a chain-extended curable polyorganosiloxane comprising the structure of formula III:

wherein $R^{13}$ is selected from alkoxy, acetoxy, enoxy, oximino and amino, $R^{14}$ is selected from alkenyl and alkynyl and z is 0-2; and c) adding a high molecular weight silicone gum and a cure system to form a curable composition.

22. The method of claim 21, wherein said catalyst in step (a) comprises an organo-lithium compound.

23. A method of sealing the stitching of an automobile airbag, comprising the steps of:
a) providing a composition comprising:
i) a chain-extended curable polyorganosiloxane comprising the structure of formula III:

$$\text{III}$$

$$(R^{13})_{3-z}\text{—}\underset{}{\overset{(R^{14})_z}{\text{Si}}}\text{—}\left(\text{O—}\left(\underset{R^{12}}{\overset{R^{11}}{\text{Si}}}\text{—O}\right)_m\underset{R^{10}}{\overset{R^9}{\text{Si}}}\text{—O—}\underset{OR^1}{\overset{OR^1}{\text{Si}}}\text{—O—}\right.$$

$$\left.\underset{R^{10}}{\overset{R^9}{\text{Si}}}\left(\text{—O—}\underset{R^{12}}{\overset{R^{11}}{\text{Si}}}\right)_m\right)_y\text{—O—}\underset{}{\overset{(R^{14})_z}{\text{Si}}}\text{—}(R^{13})_{3-z}$$

wherein:
$R^1$ is selected from tert-butyl, alkyl, allyl, phenyl, alkenyl and aryl;
$R^9$, $R^{10}$, $R^{11}$ and $R^{12}$ are independently selected from $C_{1-4}$ alkyl;
$R^{13}$ is selected from alkoxy, acetoxy, enoxy, oximino and amino;
$R^{14}$ is selected from alkenyl and alkynyl;
m is 10-2000;
y is 1-50;
z is 0-2;
ii) a high molecular weight silicone gum; and
iii) a cure system;
b) applying the composition to an inflatable substrate of an automobile airbag;
c) exposing the substrate to moisture at ambient conditions; and
d) stitching the substrate to form a sealed automobile airbag.

24. A composition comprising the reaction product of:
a) a curable composition comprising:
i) a chain-extended curable polyorganosiloxane comprising the structure of formula III:

$$\text{III}$$

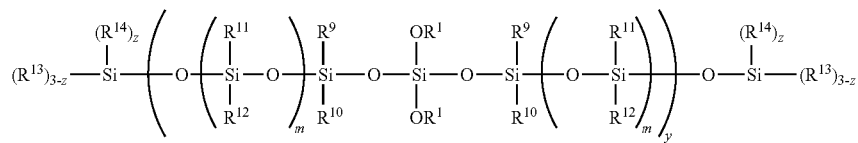
III
wherein:
R$^1$ is selected from tert-butyl, alkyl, allyl, phenyl, alkenyl and aryl;
R$^9$, R$^{10}$, R$^{11}$ and R$^{12}$ are independently selected from C$_{1-4}$ alkyl;
R$^{13}$ is selected from alkoxy, acetoxy, enoxy, oximino and amino;
R$^{14}$ is selected from alkenyl and alkynyl;
m is 10-2000;
y is 1-50;
z is 0-2; and
ii) a high molecular weight silicone gum;
b) water; and
c) a moisture curing catalyst.
* * * * *